(No Model.)
B. H. MESSLER.
STRAINER FOR SPOUTS OF PUMPS.
No. 504,438. Patented Sept. 5, 1893.
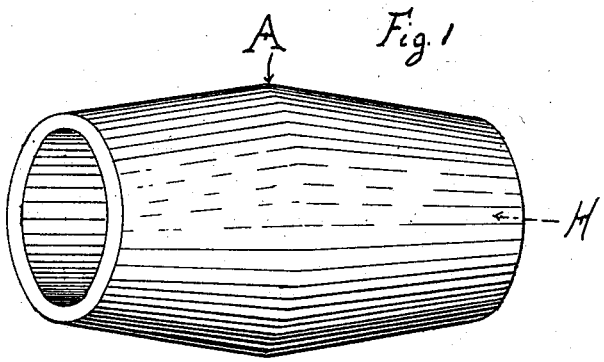
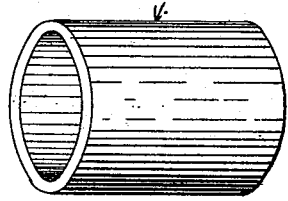
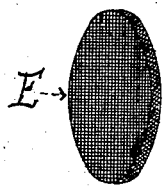
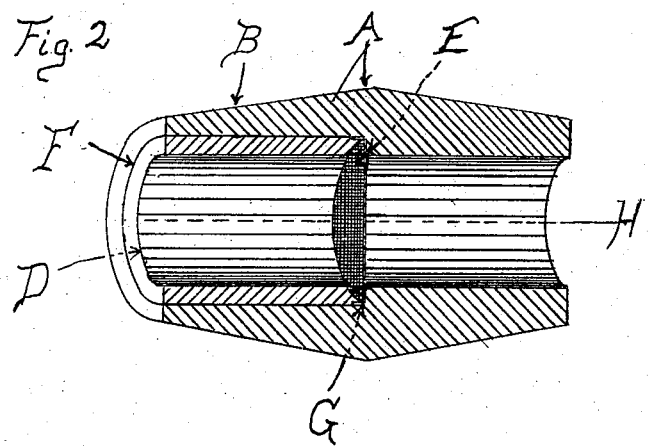
Witnesses
Marim F. Hufford
Edward S. Gaylord
Inventor
Basil H. Messler

UNITED STATES PATENT OFFICE.

BASIL H. MESSLER, OF CANTON, ILLINOIS.

STRAINER FOR SPOUTS OF PUMPS.

SPECIFICATION forming part of Letters Patent No. 504,438, dated September 5, 1893.

Application filed August 17, 1892. Serial No. 443,349. (No model.)

*To all whom it may concern:*

Be it known that I, BASIL H. MESSLER, a citizen of the United States, residing at Canton, in the county of Fulton and State of Illinois, have invented certain new and useful Improvements in Spouts for Pumps, of which the following is a specification.

My invention relates to improvements in pump spouts, and it consists in providing a reversible spout which has a strainer within the same, whereby foreign matter may be separated from the water as it is pumped from the well and the strainer cleaned by reversing the spout; and the invention further consists in the construction and combination of the parts, as will be hereinafter fully set forth and particularly pointed out in the claims.

In the accompanying drawings, forming part of this specification: Figure 1 is a perspective view showing the spout detached. Fig. 2 is a sectional view. Fig. 3 is a detail perspective view of the tube which retains the strainer in place. Fig. 4 is a perspective view of the strainer.

A designates the pump spout, which is tapered from the center to the ends thereof, as shown. This spout is provided with a central bore H, which is increased at the end F to receive the tube D and provide a shoulder G.

The strainer E is made of any suitable material, as woven wire fabric, and the part thereof adjacent to the edge is bent to provide a flange which projects at right angles with the body portion.

To assemble the parts the strainer is first placed within the spout so as to bear against the shoulder G, and then the tube D is driven in so that it will contact with the strainer and hold the same securely in place, and when driven home it will bend down the edge of the strainer and upset it so as to form a ridge of the material of which the strainer is made between the shoulder and inner end of the tube, which will assist materially in holding the strainer against displacement by pressure of the water from within. By making the spout conical at each end it can be readily reversed; and should it at any time become clogged it is only necessary to withdraw the spout from the pump stock and reverse it when it will be cleansed by the passage of the water through it.

I am aware that prior to my invention it has been proposed to provide a pump spout with a removable strainer, and I do not claim such construction broadly; but What I do claim as new, and desire to secure by Letters Patent, is—

1. In combination with a pump, a spout tapered from the center to each end, and having a bore which is increased in diameter on one side of the center of the spout, together with a strainer retained in place against the shoulder formed by the differential bore, substantially as shown, and for the purpose set forth.

2. In combination with a pump, a spout tapered from the center to each end, and having a differential bore, substantially as shown, together with a strainer the edge of which is bent at right angles to the body portion and is adapted to be upset when the strainer is driven against the shoulder, formed by the differential bore, by the tube D, for the purpose set forth.

BASIL H. MESSLER.

Witnesses:
STEPHEN ALLEN,
J. E. COLEMAN.